(12) United States Patent
Asano et al.

(10) Patent No.: US 7,260,268 B2
(45) Date of Patent: Aug. 21, 2007

(54) SIGNAL PROCESSING APPARATUS AND SIGNAL PROCESSING METHOD, RECORDING MEDIUM AND PROGRAM

(75) Inventors: Mitsuyasu Asano, Tokyo (JP); Kazuhiko Ueda, Kanagawa (JP); Takeshi Kubozono, Kanagawa (JP); Kazuki Yokoyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 755 days.

(21) Appl. No.: 10/443,926

(22) Filed: May 22, 2003

(65) Prior Publication Data

US 2004/0071361 A1    Apr. 15, 2004

(30) Foreign Application Priority Data

May 24, 2002    (JP)    ............... 2002-150057

(51) Int. Cl.
  *G06K 9/40*    (2006.01)
(52) U.S. Cl. .................................... 382/274
(58) Field of Classification Search ................ 382/199, 382/254, 260, 266; 358/3.15, 3.26, 3.27, 358/447, 463
See application file for complete search history.

(56) References Cited

U.S. PATENT DOCUMENTS 4,597,021 A * 6/1986 Yamamitsu et al. ........... 386/9
5,614,945 A * 3/1997 Sekine et al. .......... 348/207.99
6,018,600 A * 1/2000 Levin et al. ................. 382/284
6,026,184 A * 2/2000 Fukushima ................. 382/199
6,754,398 B1 * 6/2004 Yamada ...................... 382/260

FOREIGN PATENT DOCUMENTS

| JP | H06-141234 | 5/1994 |
| JP | H08-079558 | 3/1996 |
| JP | H11-017984 | 1/1999 |
| JP | 2000-156816 | 6/2000 |

* cited by examiner

*Primary Examiner*—Jose L. Couso
(74) *Attorney, Agent, or Firm*—Finnegan, Henderson, Farabow, Garrett & Dunner, L.L.P.

(57) ABSTRACT

An input signal is accurately separated into a component in which a change in signal level is sharp and having a large edge, and the other components.

A narrow band non-linear filter extracts an edge component in a relatively narrow frequency band from an input signal and outputs the signal. A wide band non-linear filter extracts an edge component in a relatively wide frequency band from the input signal and outputs the signal. A selector outputs a signal composed of the signal where an edge portion is replaced, based on a differentiated value of the signal sent by a differentiator, as the edge component of the input signal. An adder subtracts an output signal from the input signal and outputs the calculated output signal as the edge component of the input signal. This process, may be applied to an image processor.

15 Claims, 12 Drawing Sheets

SIGNAL PROCESSING APPARATUS AND SIGNAL PROCESSING METHOD, RECORDING MEDIUM AND PROGRAM

CROSS REFERENCE TO RELATED APPLICATIONS

The present document is based on Japanese Priority Application JP2002-150057, filed in the Japanese Patent Office on May 24, 2002, the contents of which being incorporated herein by reference to the extent permitted by law.

BACKGROUND OF THE INVENTION

1. Field of the Invention

The present invention relates to a signal processing apparatus and a signal processing method, a recording medium and a program. More particularly, the present invention relates to a signal processing apparatus, a signal processing method, a recording medium and a program which can use a narrow band filter and a wide band filter for accurately separating an input signal into a component of a sharp change in signal level with large edge and other components.

2. Description of the Related Art

Conventionally, in video cameras and the like, there is a method of improving contrast (a difference between brightness and darkness of image) of image data, sharpness (clearness of boundaries) and the like, emphasizing only components of the image data brightness signal without sharp change in signal level and large edge. Such method carries out a process for firstly separating the brightness signal into the component (edge component), in which the change in the signal level is sharp and the large edge is included, and the other component (nonedge component) and then emphasizing the nonedge component.

FIG. 1 is a view showing a configuration example of a conventional signal separator.

In FIG. 1, a signal separator 10 is provided with: a non-linear smoothing filter 11 for extracting the edge component of the input brightness signal; and an adder 12 for calculating a difference between the input brightness signal and the edge component in order to extract the nonedge component of the input brightness signal. It separates an input signal 21 into an edge component and a nonedge component, and outputs an output signal 31 composed of the edge component and an output signal 32 composed of the nonedge component.

The non-linear smoothing filter 11 is provided with: a register group (not shown), which is composed of a plurality of registers each holding the brightness signal corresponding to one pixel, for holding the brightness signal corresponding to a pixel group in entirely continuous predetermined sections; and a selector group (not shown) for comparing the signal levels of the brightness signals outputted from the plurality of predetermined registers included in the register group and then judging whether or not a differentiated value between those signal levels is higher than a preset threshold.

Each of the selectors in the selector group built in the non-linear smoothing filter 11, if the differentiated value between the compared signal levels is higher than the preset threshold, outputs the signals of these pixels in their original states. If the differentiated value is less than the threshold, it smoothes the signals of these pixels to a predetermined level and outputs them. In other words, the non-linear smoothing filter 11 detects the change in the signal level higher than the preset threshold from the input signal 21, and judges that portion as an edge and outputs it in its original state, and smoothes and outputs the other portions as low amplitude components. Consequently, the non-linear smoothing filter 11 extracts the edge component from the input signal 21 and generates the output signal 31.

Also, the adder 12 subtracts from the output signal 31 extracted by the non-linear smoothing filter 11, from the input signal 21, and extracts the nonedge component, and then generates the output signal 32.

As mentioned above, the signal separator 10 separates the input brightness signal (input signal 21) into the edge component (output signal 31) and the nonedge component (output signal 32) and outputs them.

SUMMARY OF THE INVENTION

However, when the above-mentioned method is used, the non-linear smoothing filter with a narrow band is used in order to extract the nonedge component from a low frequency region to a high frequency region. This may result in a case that a portion, which is not originally the edge component, is outputted as an edge portion. The nonedge component is obtained by subtracting the edge component from the input signal. Thus, if the portion that is not originally the edge component is outputted as the edge portion, a distortion is originated in the nonedge component. Even that distorted portion is emphasized in a subsequent emphasizing process, which brings about a problem that the image quality of a corresponding image is degraded.

FIG. 2A to FIG. 2C are views showing an example of a change in brightness signal in the above-mentioned case.

An input signal 21 shown in FIG. 2A is composed of edge portions in sections 42, 44 and nonedge portions in sections 41, 43 and 45. A change amount 61 in a signal level of the input signal 21 in the section 42 is larger than a range 51, and a change amount 62 in a signal level of the input signal 21 in the section 44 is also larger than the range 51. A section width of the section 44 is narrower than that of the section 42.

The non-linear smoothing filter 11 of the signal separator 10, if the change amount in the signal level of the input signal 21 is larger than the range 51, judges it as the edge component and outputs it in its original state, and if the change amount is less than the range 51, judges it as the nonedge portion and smoothes and outputs it.

In other words, the non-linear smoothing filter 11 judges the change in the signal level of the section 42, as the edge in its original state, since the section width of the section 42 is wide, in the input signal 21 shown in FIG. 2A. Also, the non-linear smoothing filter 11 judges the change in the signal level of the section 44, even in the nonedge portions before and after it, as the edge, since the section width of the section 44 is narrow, in the input signal 21 shown in FIG. 2A. By the way, the non-linear smoothing filter 11 judges the changes in the signal levels of the other sections as having low amplitude, in the input signal 21 shown in FIG. 2A.

Thus, the non-linear smoothing filter 11, when receiving the input signal 21 shown in FIG. 2A, outputs the output signal 31 (FIG. 2B) and the output signal 32 (FIG. 2C). At this event, the edge in the section 44, which has the width (section 46) wider than the edge of the input signal, as shown in FIG. 2B and FIG. 2C, is included in the output signal 31 outputted as the edge component. That distortion is included even in the output signal 32 outputted as the nonedge component. Hence, even the edge in the section 44 is emphasized in the subsequent emphasizing process, which brings about the degradation in image quality of the image corresponding to this signal.

On the contrary, a method is considered which uses the fact that the frequencies of the distortions appearing near the section 44 are biased towards a high frequency and uses a low pass filter and thereby reducing the distortions.

However, this case presents a problem that the low pass filter also reduces the high frequency components besides the distortion components and thereby brings about the degradation in the image quality.

The present invention has been proposed in view of the above-mentioned circumstances, or, in other words, in view of an existing need for accurately separating an input signal into a component in which a change in a signal level is sharp and having a large edge, and the other component.

According to a preferred embodiment of the present invention, there is provided a signal processing apparatus for separating and extracting from an input signal, an edge component containing a sharp change in signal level with large edge and a nonedge component including other components, the apparatus including a first edge component extracting means for extracting a first edge component from the input signal in a first frequency band; a second edge component extracting means for extracting a second edge component from the input signal in a second frequency band which is wider than the first frequency band; a detection means for detecting an edge included in the first edge component extracted through the first edge component extracting means; a selection means for selecting one of the first edge component extracted through the first edge component extracting means and the second edge component extracted through the second edge component extracting means as the edge component of the input signal, based on a result of detection by the detection means; and a nonedge component extracting means for extracting the nonedge component from the input signal.

In the above preferred embodiment, the second frequency band may include the first frequency band.

In addition, the first edge component extracting means and the second edge component extracting means respectively may include the change in signal level related to the first, frequency band and the second frequency band included in the input signal, and extract from the input signal a smoothed signal of the change in signal level for other frequency bands.

The signal processing apparatus according to the preferred embodiment of the present invention may further include a differentiation means for calculating a differentiated value value of the first edge component extracted through the first edge component extracting means, the detection means comparing the differentiated value value with a threshold value and detecting the edge included in the first edge component based on a result of the comparison.

In addition in the signal processing apparatus according to the preferred embodiment of the present invention, the selection means selects the second edge component as an edge component of the input signal if the detection means detects the edge included in the first edge component; and the first edge component as an edge component of the input signal if the detection means does not detect the edge included in the first edge component.

Furthermore, the nonedge component extracting means may include a subtraction means for subtracting from the input signal one of the first edge component and the second edge component selected by the selection means as the edge component of the input signal.

According to another preferred embodiment of the present invention, there is provided a signal processing method of separating and extracting from an input signal, an edge component containing a sharp change in signal level with large edge and a nonedge component including other components, the method including a first edge component extracting step of extracting a first edge component from the input signal in a first frequency band; a second edge component extracting step of extracting a second edge component from the input signal in a second frequency band which is wider than the first frequency band; a detection step of detecting an edge included in the first edge component extracted through the first edge component extracting means; a selection step of selecting one of the first edge component extracted through the first edge component extracting means and the second edge component extracted through the second edge component extracting means as the edge component of the input signal, based on a result of detection by the detection means; and a nonedge component extracting step of extracting the nonedge component from the input signal.

Another preferred embodiment of the present invention recording medium provides a recording a computer-readable program for utilization in a signal processing apparatus for separating and extracting from an input signal, an edge component containing a sharp change in signal level with large edge and a nonedge component including other components, the program including a first edge component extracting step of extracting a first edge component from the input signal in a first frequency band; a second edge component extracting step of extracting a second edge component from the input signal in a second frequency band which is wider than the first frequency band; a detection step of detecting an edge included in the first edge component extracted through the first edge component extracting means; a selection step of selecting one of the first edge component extracted through the first edge component extracting means and the second edge component extracted through the second edge component extracting means as the edge component of the input signal, based on a result of detection by the detection means; and a nonedge component extracting step of extracting the nonedge component from the input signal.

Furthermore, another preferred embodiment of the present invention provides a computer-executable program for controlling a signal processing apparatus for separating and extracting from an input signal, an edge component containing a sharp change in signal level with large edge and a nonedge component including other components, the program including a first edge component extracting step of extracting a first edge component from the input signal in a first frequency band; a second edge component extracting step of extracting a second edge component from the input signal in a second frequency band which is wider than the first frequency band; a detection step of detecting an edge included in the first edge component extracted through the first edge component extracting means; a selection step of selecting one of the first edge component extracted through the first edge component extracting means and the second edge component extracted through the second edge component extracting means as the edge component of the input signal, based on a result of detection by the detection means; and a nonedge component extracting step of extracting the nonedge component from the input signal.

Still another preferred embodiment of the present invention provides a signal processing apparatus for separating and extracting from an input signal, an edge component containing a sharp change in signal level with large edge and a nonedge component including other components, the apparatus including a first edge component extracting means for extracting a first edge component from the input signal in a first frequency band; a second edge component extracting means for extracting a second edge component from the input signal in a second frequency band which is wider than the first frequency band; a mixing means for mixing the first edge component with the second edge component; and a nonedge component extracting means for extracting the nonedge component from the input signal.

Such apparatus may have the second frequency band including the first frequency band.

Also, in the apparatus according to the preferred embodiment as described above may have the first edge component extracting means and the second edge component extracting means respectively including the change in signal level related to the first frequency band and the second frequency band included in the input signal, and extracting from the input signal a smoothed signal of the change in signal level for other frequency bands.

In addition, the apparatus according to the preferred embodiment of the present invention may further include a differentiation means for calculating a differentiated value value of the first edge component extracted through the first edge component extracting means, the mixing means mixing the first edge component with the second edge component based on a magnitude of the differentiated value value.

The mixing means may increase a mixing rate of the first edge component and decrease a mixing rate of the second edge component according to a decrease of the differentiated value value of the first edge component; and decrease a mixing rate of the first edge component and increase a mixing rate of the second edge component according to an increase of the differentiated value value of the first edge component Furthermore, the mixing means may output the first edge component without mixing the second edge component if the differentiated value value of the first edge component is smaller than a first threshold value; and output the second edge component without mixing the first edge component if the differentiated value value of the first edge component is larger than a second threshold value.

The signal processing apparatus according to the preferred embodiment of the present invention may have the nonedge component extracting means including a subtraction means for subtracting from the input signal an edge component constituted by a signal including the first edge component and the second edge component mixed by the mixing means.

Another preferred embodiment of the present invention provides a signal processing method of separating and extracting from an input signal, an edge component containing a sharp change in signal level with large edge and a nonedge component including other components, the method including a first edge component extracting step of extracting a first edge component from the input signal in a first frequency band; a second edge component extracting step of extracting a second edge component from the input signal in a second frequency band which is wider than the first frequency band; a mixing step of mixing the first edge component with the second edge component; and a nonedge component extracting step of extracting the nonedge component from the input signal.

In addition, another preferred embodiment of the present invention provides a recording medium recording a computer-readable program for utilization in a signal processing apparatus for separating and extracting from an input signal, an edge component containing a sharp change in signal level with large edge and a nonedge component including other components, the program including a first edge component extracting step of extracting a first edge component from the input signal in a first frequency band; a second edge component extracting step of extracting a second edge component from the input signal in a second frequency band which is wider than the first frequency band; a mixing step of mixing the first edge component with the second edge component; and a nonedge component extracting step of extracting the nonedge component from the input signal.

Moreover, another preferred embodiment of the present invention provides a computer-executable program for controlling a signal processing apparatus for separating and extracting from an input signal, an edge component containing a sharp change in signal level with large edge and a nonedge component including other components, the program including: a first edge component extracting step of extracting a first edge component from the input signal in a first frequency band; a second edge component extracting step of extracting a second edge component from the input signal in a second frequency band which is wider than the first frequency band; a mixing step of mixing the first edge component with the second edge component; and a nonedge component extracting step of extracting the nonedge component from the input signal.

As mentioned above, according to the preferred embodiments of the present invention, the input signal can be accurately separated into the component in which the change in the signal level is sharp with a large edge, and the other components.

In the first signal processing apparatus, the first signal processing method, the first recording medium and the first program according to the preferred embodiments of the present invention as described above, in a first frequency band, a first edge component is extracted from an input signal, and in a second frequency band wider than the first frequency band, a second edge component is extracted from the input signal. Then, an edge included in the first edge component is detected. In accordance with the detected result, any of the first edge component and the second edge component is selected as the edge component of the input signal. Moreover, the nonedge component is extracted from the input signal.

In the second signal processing apparatus, the second signal processing method, the second recording medium and the second program according to the preferred embodiments of the present invention as described above, in a first frequency band, a first edge component is extracted from an input signal, and in a second frequency band wider than the first frequency band, a second edge component is extracted from the input signal. Then, the extracted first and second edge components are mixed. Moreover, the nonedge component is extracted from the input signal.

BRIEF DESCRIPTION OF THE DRAWINGS

The above and other objects, features and advantages of the present invention will become more apparent to those skilled in the art from the following description of the presently preferred exemplary embodiments of the invention taken in conjunction with the accompanying drawings, in which.

DESCRIPTION OF THE PREFERRED EMBODIMENTS OF THE INVENTION

Figure 1:
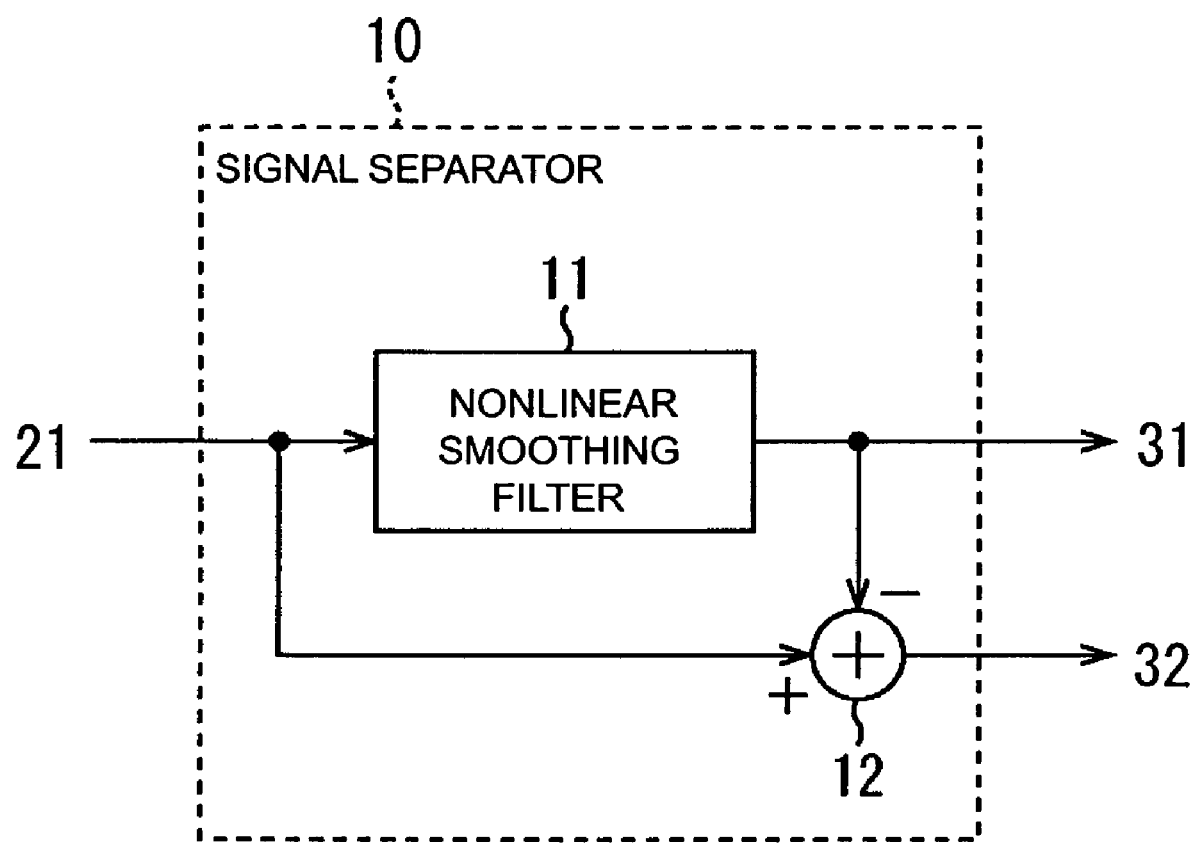
FIG. 1 is a view showing a configuration example of a conventional signal separator.
Figure 2:
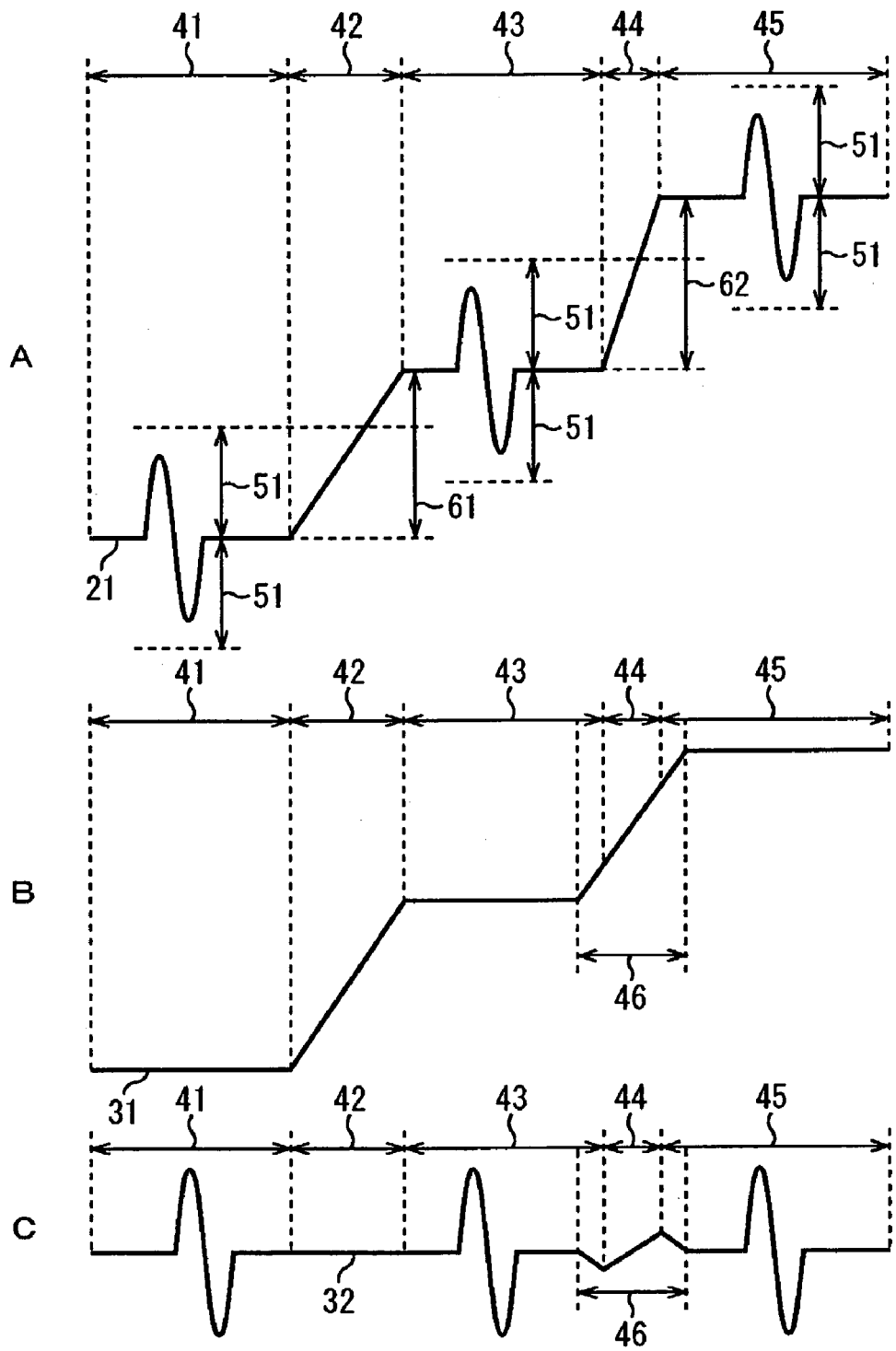
FIGS. 2A to 2C are views showing examples of wave forms of a brightness signal processed by a signal processor of FIG. 1.
Figure 3:
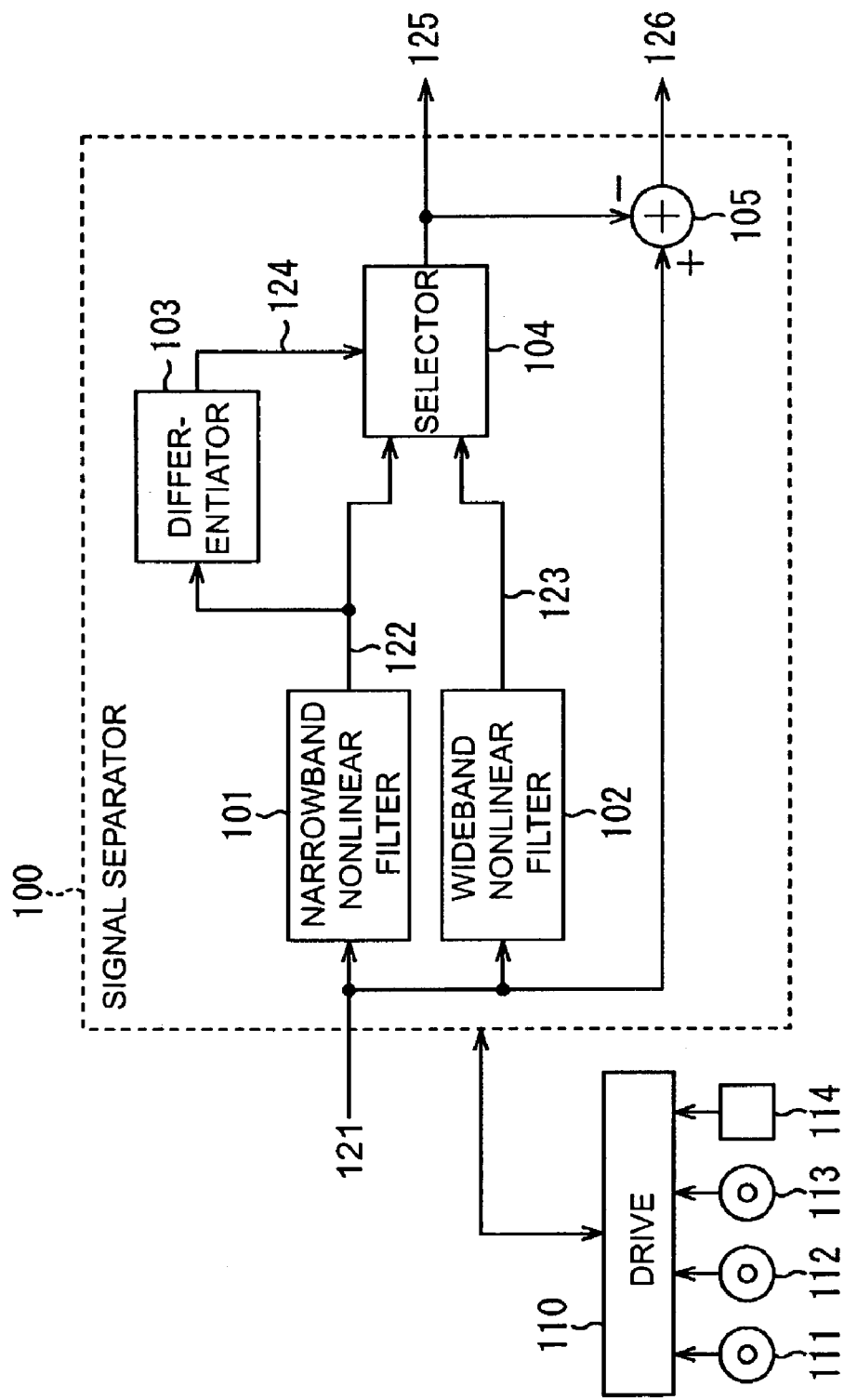
FIG. 3 is a view showing a configuration example of a signal separator to which a preferred embodiment of the present invention is applied.

FIG. 3 is a view showing a configuration example of a signal separator to which a preferred embodiment of the present invention is applied.

In FIG. 3, a signal separator 100 is provided with: a narrow band non-linear filter 101 through which a signal of a frequency in a relatively narrow range can be passed; a wide band non-linear filter 102 through which a signal of a frequency in a relatively wide range can be passed; a differentiator 103 for calculating a differentiated value value of an input signal; a selector 104 for selectively outputting one of two input signals; and an adder 105 for outputting a differentiated value between the two input signals.

The narrow band non-linear filter 101 is the non-linear filter, which changes a signal level within a limit on a frequency band in a relatively narrow preset range, with regard to a level change in an input signal, and then smoothing a portion of another preset level or less. An input signal 121 inputted to the signal separator 100 is a brightness signal of an image data, which contains an edge having a sharp change in the signal level and includes an edge component having the edge and the other nonedge portions.

The edge portion of the edge component of the input signal 121 implies that a difference in a pixel value between pixels adjacent or close to each other in the image corresponding to the image data is large. As the difference is larger, its frequency reaches up to a band of higher frequency. The narrow band non-linear filter 101 extracts this edge portion as the setting for limiting to a frequency band in a relatively narrow range so as to enable the smoothing operation to be carried out from a low frequency region to a wide band in the input signal 121. A signal 122 outputted from the narrow band non-linear filter 101 is sent to the differentiator 103 and the selector 104.

The wide band non-linear filter 102 is a kind of a high-cut filter (low pass filter), which is set so as to extract an edge within a passage band up to a preset high frequency component in the input signal 121. Thus, a signal 123 outputted from the wide band non-linear filter 102 includes the components of the nonedge portions included in the signal 122 outputted from the narrow band non-linear filter 101. The signal 123 outputted from the wide band non-linear filter 102 is sent to the selector 104.

The differentiator 103 differentiates the signal 122 sent from the narrow band non-linear filter 101 and sends a signal 124, which is the differential value (or differentiated value value) of the signal 122, to the selector 104.

In accordance with the value of the signal 124 sent by the differentiator 103, the selector 104 selects any one of the signal 122 sent from the narrow band non-linear filter 101 and the signal 123 sent from the wide band non-linear filter 102, and then outputs as a signal 125.

The adder 105 subtracts an output signal 125 from the input signal 121 and outputs as an output signal 126.

A drive 110 is also connected to the signal separator 100, as necessary. A magnetic disk 111, an optical disk 112, a magneto-optic disk 113 or a semiconductor memory 114 or the like is suitably inserted therein. A computer program read out from it is installed in memories (all of them are not shown) built in the narrow band non-linear filter 101, the wide band non-linear filter 102, the differentiator 103, the selector 104 and the adder 105, as necessary.

In addition, a signal separating process of the signal separator 100 in FIG. 3 will be described below with reference to FIG. 4. Also, it will be described below as necessary, with reference to FIG. 5 to FIG. 10.

At first, as a step S1, the narrow band non-linear filter 101 of the signal separator 100, to which an input signal 121 is sent from outside, extracts a large level change within the limit on a preset first band width from the input signal 121. The narrow band non-linear filter 101 is set so as to change the signal level of the output signal 122, with regard to the first band width whose high frequency is relatively narrow, including the frequency band of the edge portion of the input signal 121, as mentioned above. In accordance with this setting, the narrow band non-linear filter 101 extracts the signal including the edge portion of the input signal 121 as the edge component, and sends the signal 122 including the extracted edge component to the differentiator 103 and the selector 104.

Figure 5:
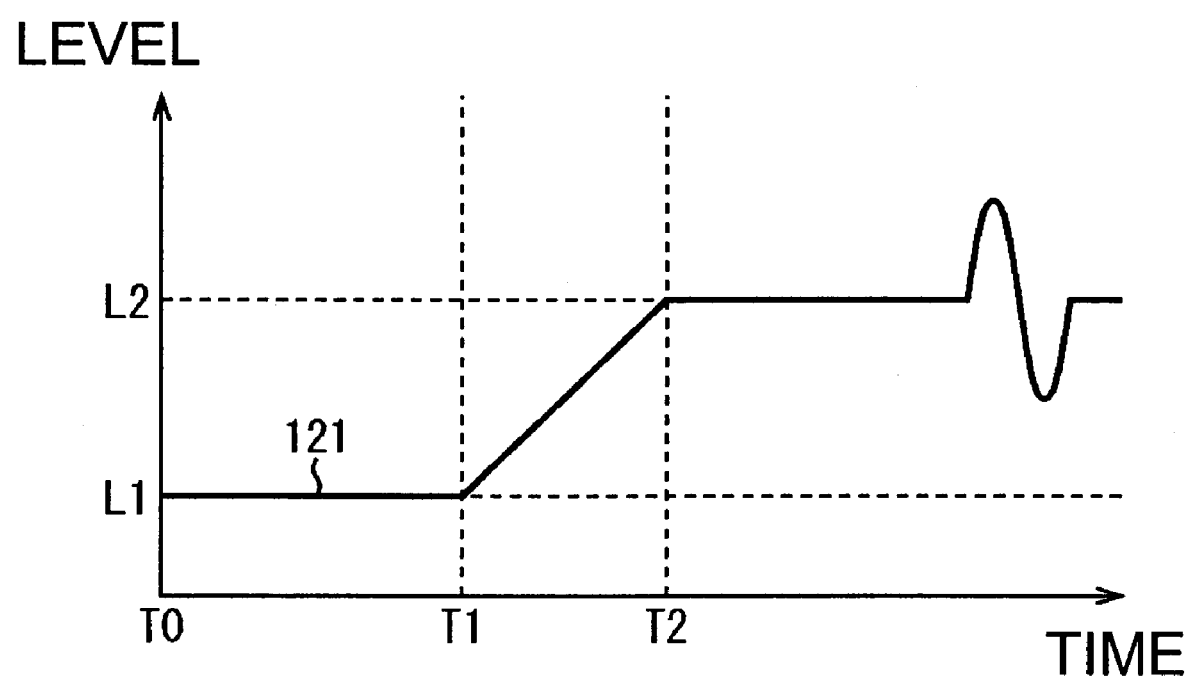
FIG. 5 is a view showing an example of an input signal inputted to the signal separator in FIG. 3.

FIG. 5 is a graphic showing an example of a waveform of the input signal 121 in FIG. 3. A signal level of the input signal 121 shown in FIG. 5 is L1 and constant in a section between a time T0 and a time T1, and it is straightly changed from L1 to L2 in a section between the time T1 and a time T2. Also, in a section after the time T2, the input signal 121 has an amplitude of a narrow signal level width with L2 as its center.

Figure 4:
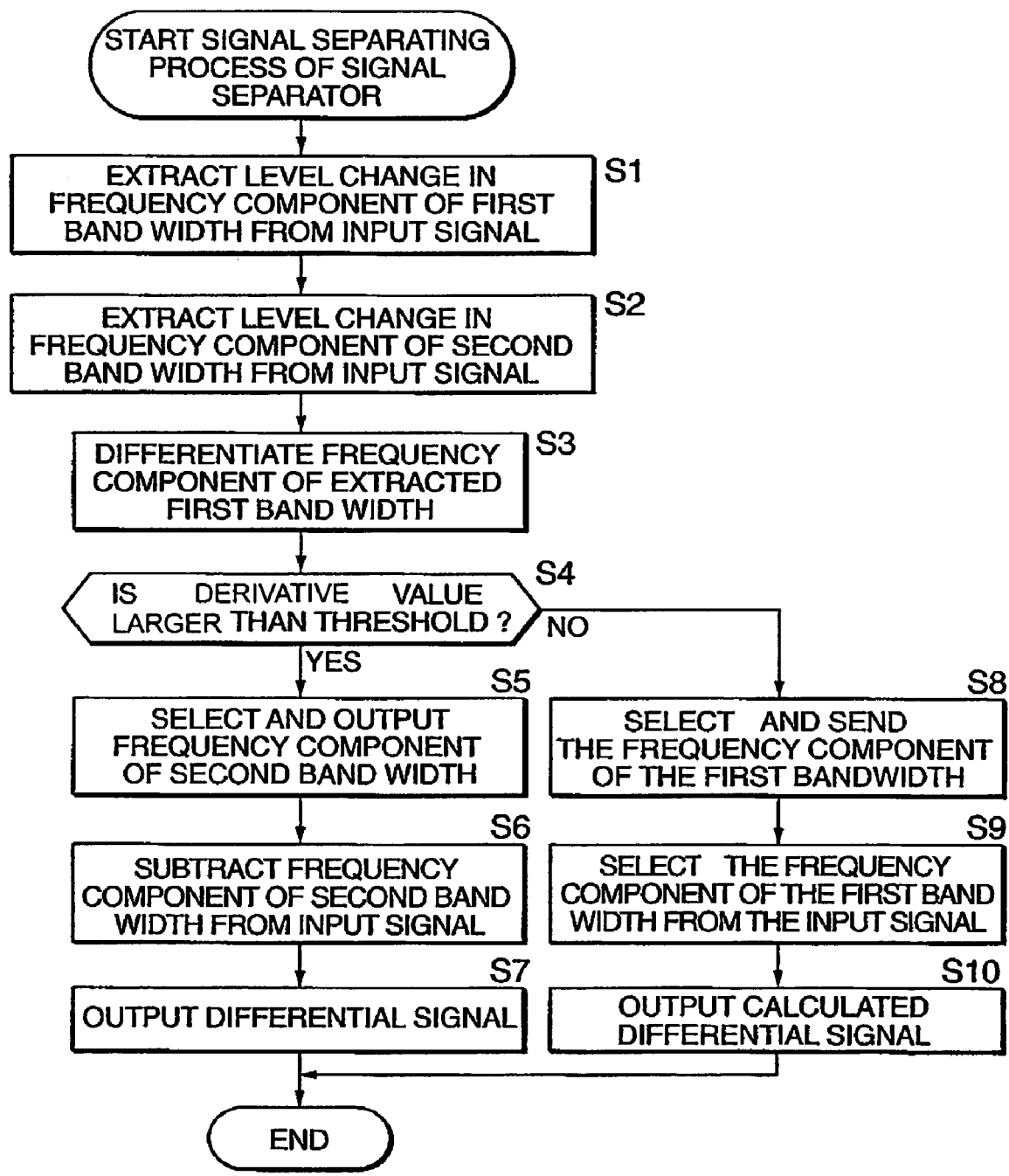
FIG. 4 is a flowchart explaining a signal separating process through a signal separator in FIG. 3.
Figure 6:
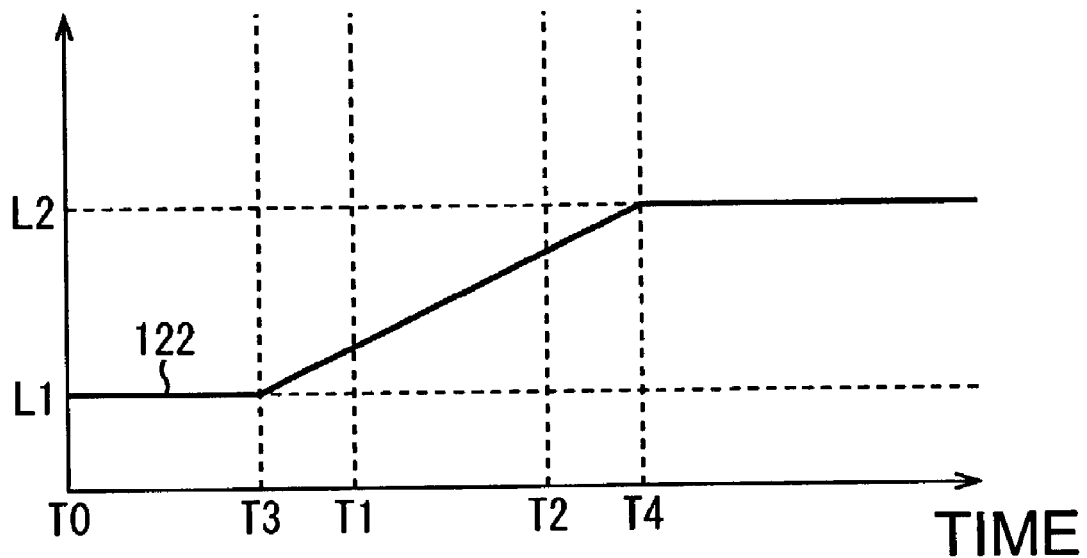
FIG. 6 is a view showing an example of a signal outputted from a narrow band non-linear filter in FIG. 3.

The narrow band non-linear filter 101, to which the input signal 121 shown in FIG. 5 is inputted, detects edges in the section from the time T1 to the time T2 through the process at the step S1 in FIG. 4, and outputs a signal 122 shown in FIG. 6 as an edge component. A waveform of the signal 122 outputted from the narrow band non-linear filter 101 is a waveform in which only the change in the signal level in the section from the time T1 and the time T2 is extracted from the changes in the signal levels included in the input signal 121 shown in FIG. 5.

By the way, the frequency property of the narrow band non-linear filter 101 is such that a low frequency is a cut-off frequency, and the signal level of the signal 122 outputted from the narrow band non-linear filter 101 is changed in a section from a time T3 and a time T4, which is wider than the section from the time T1 and the time T2. In other words, the section where the signal level of the signal 122 is changed is wider than the section where the signal level of the signal 121 is changed.

Turning back to FIG. 4, at step S2, the wide band non-linear filter 102 of the signal separator 100, to which the input signal 121 is sent from the outside, extracts the signal level change in the preset second bandwidth from the input signal 121. The wide band non-linear filter 102 is set so as to sufficiently smooth only the change in the signal level in the high frequency that does not include the frequency band of the edge portion of the input signal 121, and then change the signal level of the output signal 123, in the case of the input of the input signal of the relatively wide second band width except the low frequency, including the frequency band of the edge portion of the input signal 121. In accordance with this setting, the wide band non-linear filter 102 extracts as the edge component the signal of the wide band including the edge portion of the input signal 121, and sends to the selector 104 the signal 123 including the extracted edge component.

Figure 7:
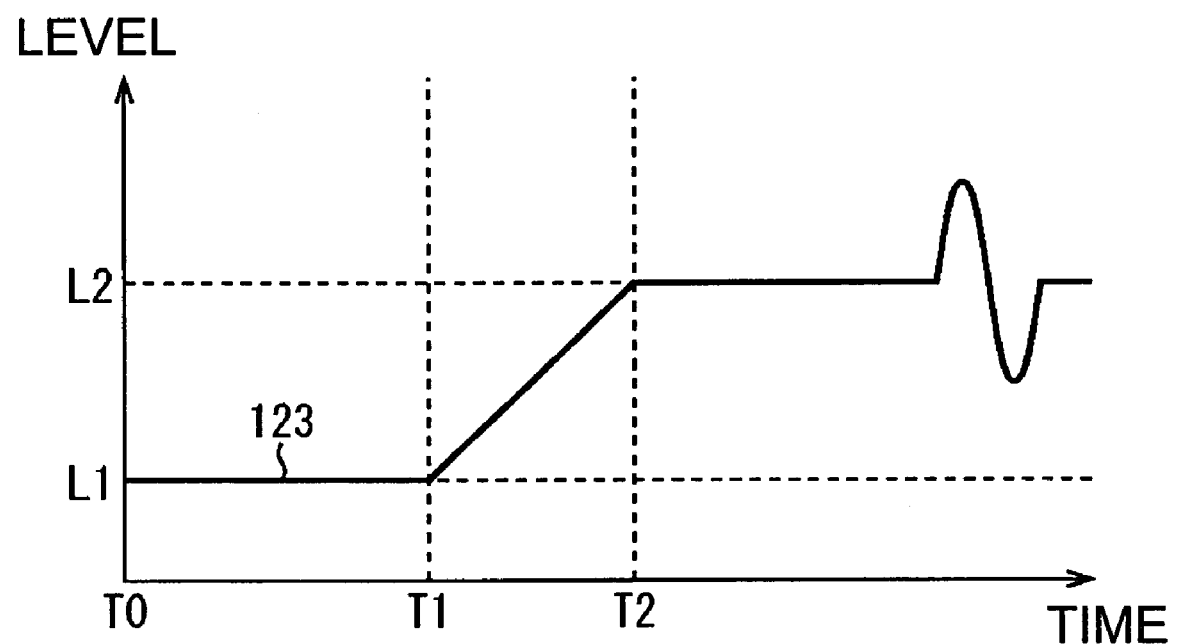
FIG. 7 is a view showing an example of a signal outputted from a wide band non-linear filter in FIG. 3.

The wide band non-linear filter 102, to which the input signal 121 shown in FIG. 5 is inputted, outputs a signal 123 shown in FIG. 7 as the edge component through the process at the step S2 in FIG. 4. In the case of the example shown in FIG. 7, the waveform of the signal 123 outputted from the wide band non-linear filter 102 becomes the waveform in which all of the signal levels included in the input signal 121 in FIG. 5 are extracted.

By the way, the frequency property of the wide band non-linear filter 102 is not perfectly flat for the frequency. Thus, strictly, in the edge portion included in the signal 123 outputted from the wide band non-linear filter 102, a distorted waveform is formed as compared with the edge portion included in the input signal 121. However, the wide band non-linear filter 102 extracts the signal of the sufficiently wide band, as compared with the frequency property of the narrow band non-linear filter 101. For this reason, as compared with the frequency property of the narrow band non-linear filter 101, the frequency property of the wide band non-linear filter 102 has the sufficiently flat property for the frequency band of the input signal. Hence, hereafter, the explanation is carried out under the assumption that the frequency of the edge portion included in the signal 123 outputted from the wide band non-linear filter 102 shown in FIG. 7 is equal to the frequency of the edge portion included in the input signal 121 shown in FIG. 5.

Turning back to FIG. 4, at the step S3, the differentiator 103, to which the signal 122 generated by the process at the step S1 is sent, differentiates the signal 122 that is the frequency component of the first band width extracted from the input signal 121, and generates a signal 124 and then sends to the selector 104.

Figure 8:
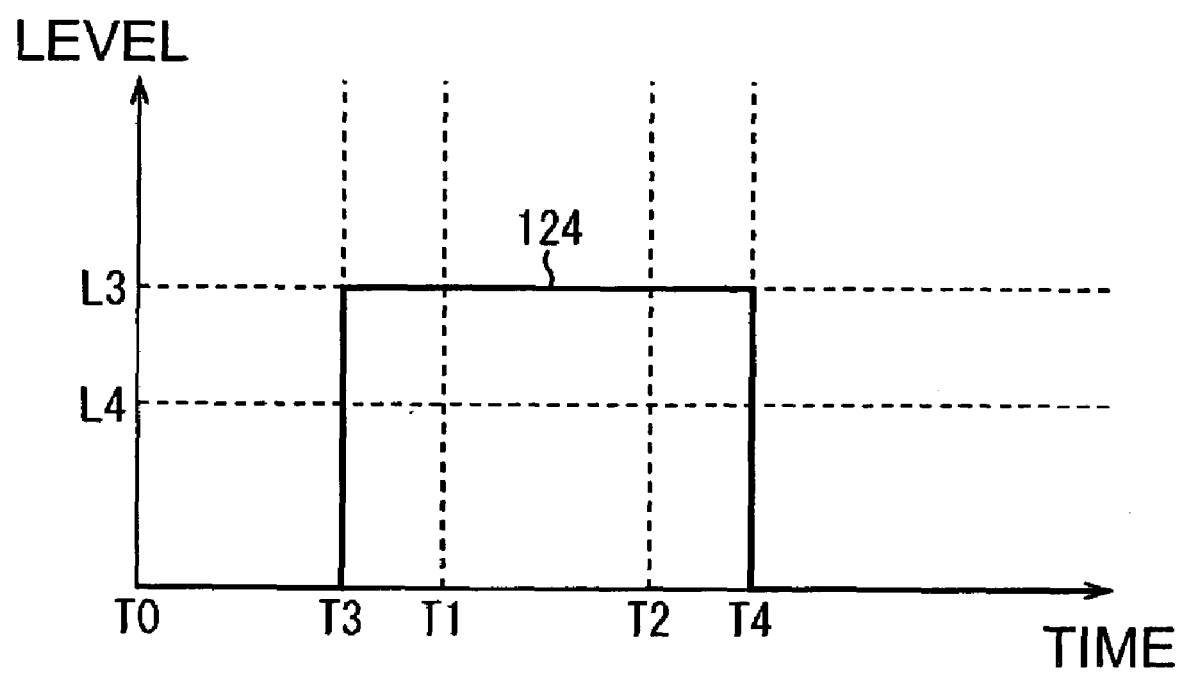
FIG. 8 is a view showing an example of a signal outputted from a differentiator in FIG. 3.

The differentiator 103, to which the signal 122 shown in FIG. 6 is sent, differentiates the signal 122 through the process at the step S3 in FIG. 4, and detects the changed portion in the signal 122 and then outputs a signal 124 shown in FIG. 8. In the case of the example shown in FIG. 8, a signal level of the signal 124 becomes L3, corresponding to the portion where the signal level of the signal 122 in FIG. 6 is changed, and becomes [0] in the other portions.

The selector 104, to which the signal 124 generated by the process at the step S3 is sent, holds a preset threshold (the L4 of FIG. 8). At the step S4 in FIG. 4, it compares the signal level of the signal 124 with the threshold L4 and judges whether the differentiated value value of the signal 122 outputted by the narrow band non-linear filter 101 is higher than the threshold L4. In this way, the selector 104 detects the portion where the change in the signal level included in the signal 122 is sharp, namely, the edge.

In the case of the example shown in FIG. 8, only in the section from the time T3 to the time T4, the signal level of the signal 124 becomes the L3 and larger than the threshold L4. Thus, the selector 104 judges that the differentiated value value of the signal 122 is larger than the threshold L4 in the section from the time T3 to the time T4, and judges that the differentiated value value of the signal 122 is less than the threshold L4 in the other sections.

If the differentiated value value of the signal 122 is judged to be larger than the threshold at the step S4 in FIG. 4, the selector 104 advances the process to the step S5, and selects the frequency component (signal 123) of the second band width sent by the wide band non-linear filter 102, and outputs to the outside of the signal processor 100 as the edge component of the input signal 121 (the signal 125).

Also, the signal 125 outputted by the selector 104 is sent to the adder 105. At the step S6, the adder 105 subtracts the frequency component (the output signal 125) of the second band width sent by the selector 104, from the input signal 121.

Then, at a step S7, the adder 105 outputs the calculated differential signal as the nonedge component of the input signal 121 (output signal 126). Then, the signal separating process is ended.

Also, if the differentiated value value of the signal 122 is judged to be less than the threshold at the step S4, the selector 104 advances the process to the step S8, and selects the frequency component (signal 122) of the first band width sent by the narrow band non-linear filter 101, and outputs to the outside of the signal processor 100 as the edge component of the input signal 121 (the signal 125).

Also, the signal 125 outputted by the selector 104 is sent to the adder 105. At a step S9, the adder 105 subtracts the frequency component (the output signal 125) of the first band width sent by the selector 104, from the input signal 121.

Then, at a step S10, the adder 105 outputs the calculated differential signal as the nonedge component of the input signal 121 (output signal 126). Then, the signal separating process is ended.

In other words, in accordance with the signal level of the signal 124 that is the differentiated value value of the signal 122 outputted from the narrow band non-linear filter 101, the selector 104 detects the edge included in the edge component of the input signal 121. Then, as for that portion, it outputs the signal 123 outputted from the wide band non-linear filter 102 as the edge component of the input signal 121. As for the other portions, it outputs the signal 122 outputted from the narrow band non-linear filter 101 as the edge component of the input signal 121.

Figure 9:
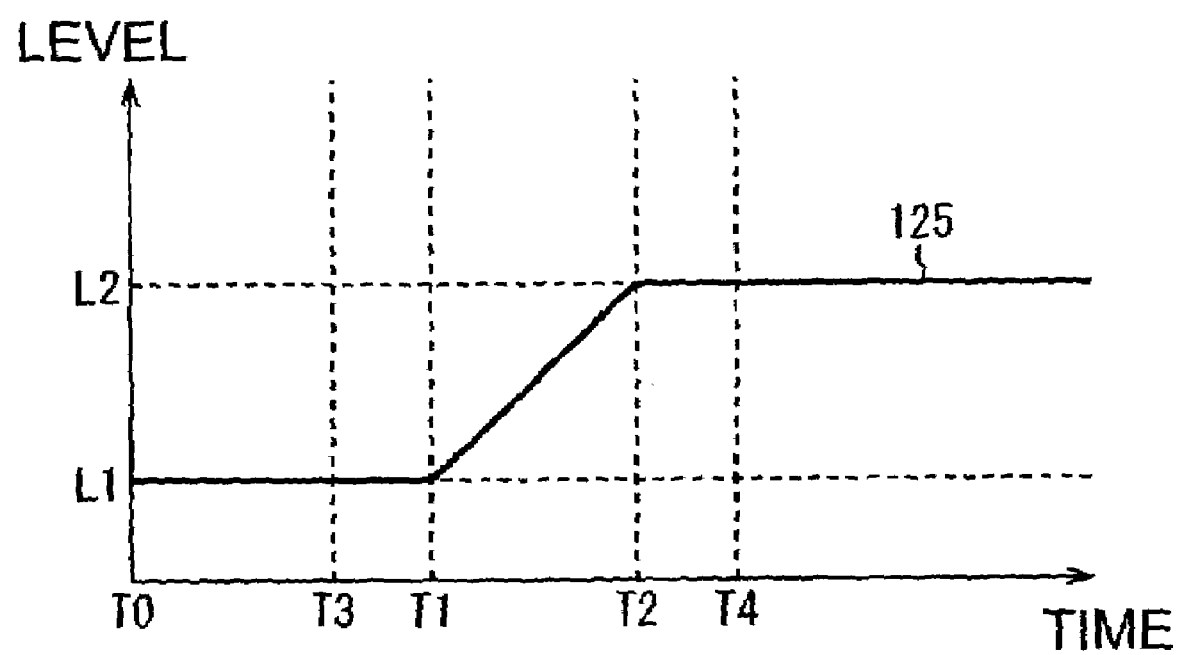
FIG. 9 is a view showing an example of an output signal, which is outputted from the signal separator in FIG. 3 and composed of edge components of an input signal.

FIG. 9 is a graphic showing an example of a waveform of the output signal 125 composed of the edge components of the input signal 121. In FIG. 9, the output signal 125 is the edge component of the input signal 121 shown in FIG. 5. In the section from the time T3 to the time T4, the output signal 125 is formed by the signal 123 shown in FIG. 7 which is outputted from the wide band non-linear filter 102 and, for the other sections, it is formed by the signal 122 outputted from the narrow band non-linear filter 101 as a result of input of input signal 121.

Also, the adder 105 subtracts the output signal 125 outputted by the selector 104 from the input signal 121, and thereby outputs the nonedge component of the input signal 121, which is not included in the output signal 125, as the output signal 126.

Figure 10:
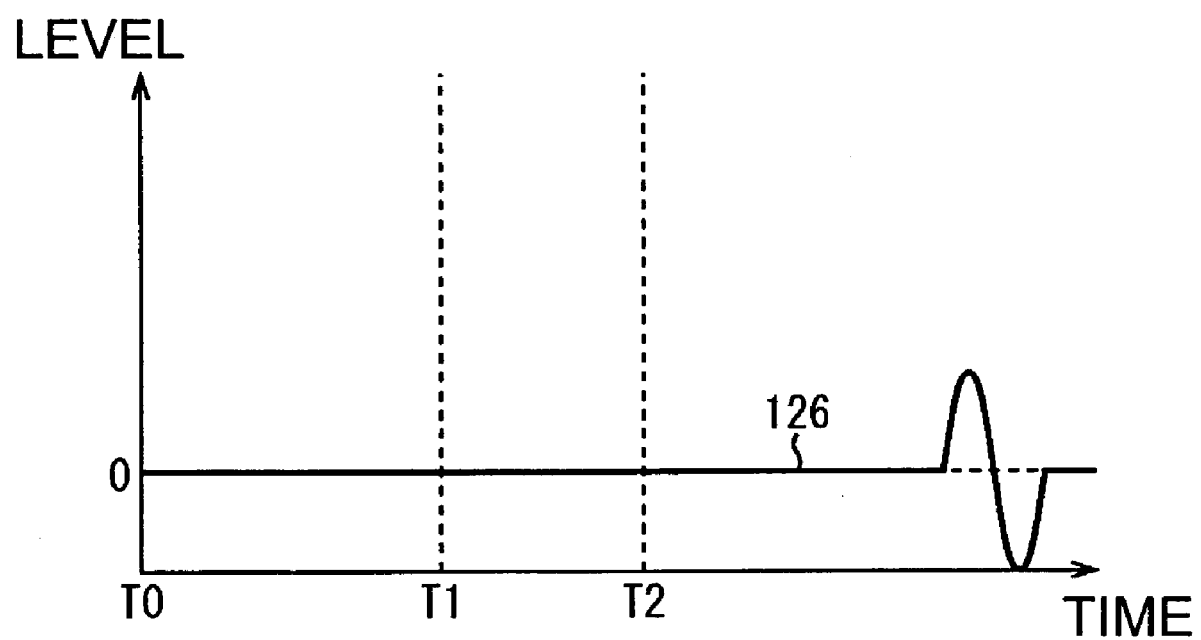
FIG. 10 is a view showing an example of an output signal, which is outputted from the signal separator in FIG. 3 and composed of nonedge components of the input signal.

FIG. 10 is a view showing an example of a waveform of the output signal 126, which is outputted from the adder 105 and composed of the nonedge component of the input signal 121. In FIG. 10, the output signal 126 is the signal in which the output signal 125 is subtracted from the input signal 121, and it does not include the edge in the section from the time T1 to the time T2 which is included in the input signal 121 shown in FIG. 5, and it includes the amplitude of a narrow signal level width with a level [0] as its center.

For each input of the input signal 121, the signal separator 100 repeatedly executes the signal separating process as mentioned above, and separates the input signal 121 into the output signal 125 composed of the edge component and the output signal 126 composed of the nonedge component, and then outputs the signals.

As mentioned above, the signal separator 100 may accurately separate the input signal 121 into the output signal 125 composed of the edge component and the output signal 126 composed of the nonedge component by applying the edge component of the input signal 121 extracted by the wide band non-linear filter 102, to the edge portion whose waveform is distorted, among the edge components of the input signal 121 extracted by the narrow band non-linear filter 101.

In the above-mentioned description, the signal separator 100 has been explained as the configuration of using the selector 104. However, it may be configured by using a mixer for mixing the signal 122 and the signal 123 at a predetermined rate or proportion and outputting, instead of the selector 104.

Figure 11:
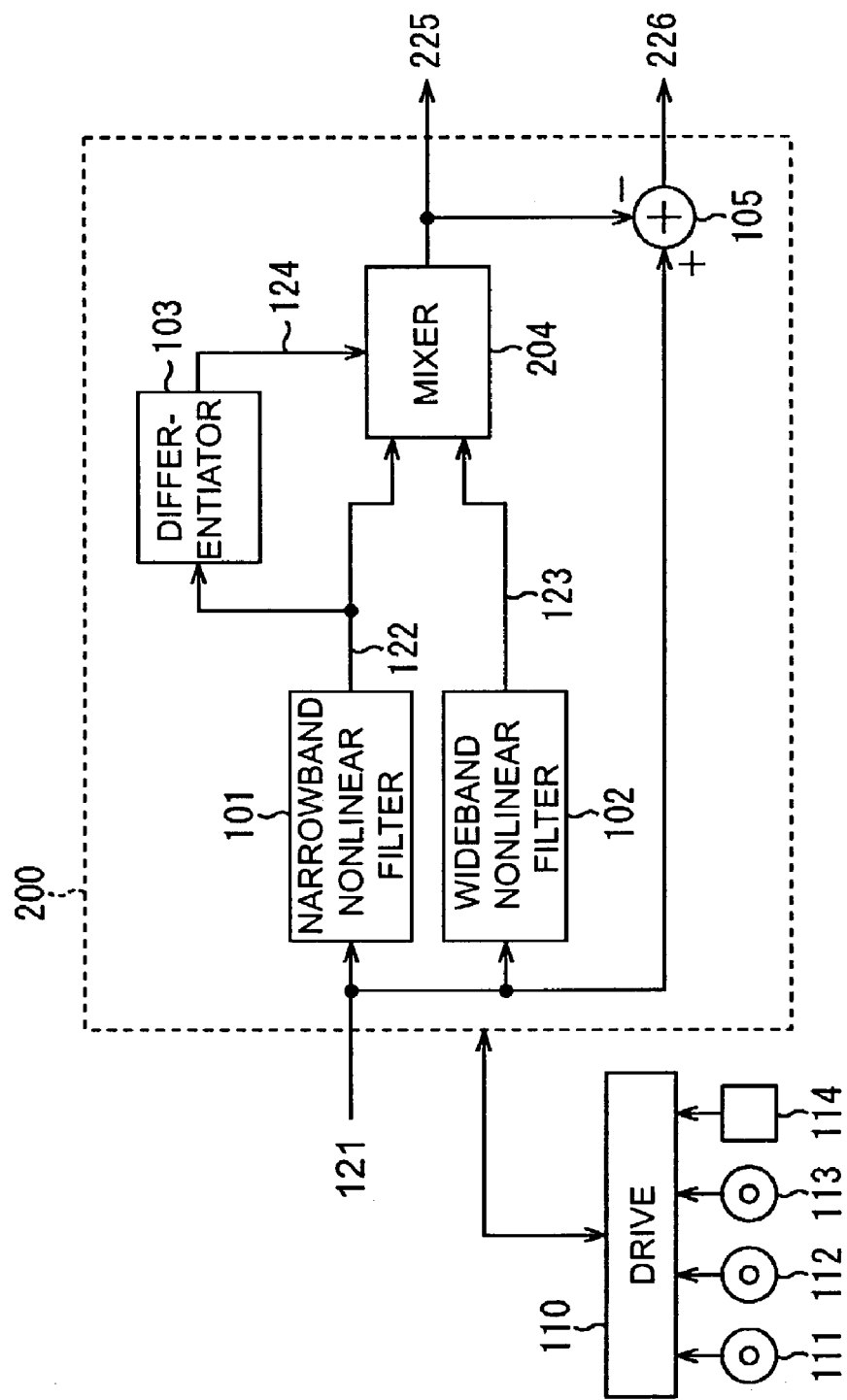
FIG. 11 is a view showing another configuration example of the signal separator to which the present invention is applied.

FIG. 11 is a view showing another example of the signal separator to which a preferred embodiment of the present invention is applied.

In FIG. 11, a signal separator 200 is configured by using a mixer 204, instead of the selector 104 of the signal separator 100 shown in FIG. 3.

The mixer 204 mixes the signal 122 sent from the narrow band non-linear filter 101 and the signal 123 sent from the wide band non-linear filter 102 in accordance with the signal level of the signal 124 sent from the differentiator 103, and outputs as the edge component (output signal 225) of the input signal 121. The rate at which the mixer 204 mixes the signal 122 and the signal 123 is defined in advance and stored in a memory (not shown) built in the mixer 204.

Figure 12:
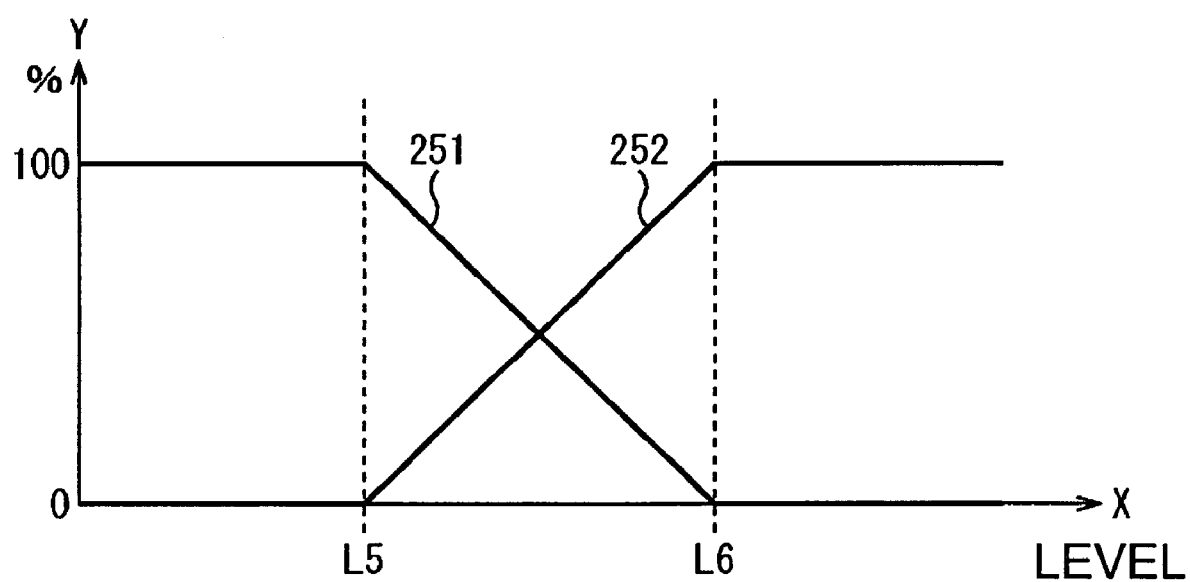
FIG. 12 is a view illustrating an input signal mixing property of a mixer in FIG. 11.

FIG. 12 is a view showing an input signal mixing property of the mixer 204.

In FIG. 12, a horizontal axis indicates the signal level of the signal 124 sent from the differentiator 103, and a vertical axis indicates the rate or proportion at which the two input signals are mixed. Also, a curve 251 is a characteristic curve corresponding to the signal 122, and a curve 252 is a characteristic curve corresponding to the signal 123.

In other words, if the signal level of the signal 124 is lower than L5, the mixer 204 does not mix the signal 122 with the signal 123, and outputs it in its original state. If the signal level of the signal 124 is higher than the L5 and lower than L6, the mixer 204 mixes the signal 122 and the signal 123 at the rates indicated by the curves 251, 252 in FIG. 12 and outputs. If the signal level of the signal 124 is higher than the L6, the mixer 204 does not mix the signal 123 with the signal 122 and outputs it in its original state.

The adder 105 subtracts the output signal 225 outputted by the mixer 204 from the input signal 121, and outputs that differential signal as the nonedge component (output signal 226) of the input signal 121.

As a result of the above-mentioned process, in the mixer 204, for example, if the operational flow is shifted from the state at which the signal 122 is outputted as the output signal 225 to the state at which the signal 123 is outputted as the output signal 225, the rate at which the signal 123 is mixed is gradually increased so that the change in that state can be smoothly done. Thus, it is possible to suppress the occurrence of noises, such as jitter and the like, which may be caused by the switching operation between the output signals.

By the way, the signal separating process of the signal separator 200 in the case of the usage of the mixer 204 is executed substantially similar to the signal separating process of the signal separator 100 explained with reference to the flowchart in FIG. 4.

A similar process except for the following point may be executed in the signal separating processes of the signal separators 100, 200. In other words, in the signal separating process of the signal separator 100, the selector 104 judges whether the level change (the signal 122) in the frequency component of the first band width is outputted or the level change (the signal 123) in the frequency component of the second band width is outputted, depending on whether or not the differentiated value (the signal level of the signal 124) of the level change (the signal 122) in the frequency component of the first band width extracted from the input signal 121 is higher than the predetermined threshold. On the contrary, in the signal separating process of the signal separator 200, the mixer 204 determines the rate at which the level change (the signal 122) in the frequency component of the first band width and the level change (the signal 123) in the frequency component of the second band width are mixed, in accordance with the differentiated value (the signal level of the signal 124) of the level change (the signal 122) in the frequency component of the first band width extracted from the input signal 121 and outputs it.

The above-mentioned series of processes may be executed through hardware. However, they can be also executed through software. If the series of processes are executed through software program, programs constituting the software are installed in a computer contained in a dedicated hardware or, for example, in a general personal computer that can execute various functions through the installation of various programs, and the like, from a network, a recording medium and the like.

As shown in FIG. 3 and FIG. 11, apart from the apparatus body, such recording medium is not only constituted by package media, such as a magnetic disk 111 (including a flexible disk) distributed to provide a program to a user, in which a program is recorded, an optical disk 112 (including CD-ROM (Compact Disc-Read Only Memory), DVD (Digital Versatile Disk), a magneto-optic disk 113 (MD (Mini-Disk—a trade mark)), or a semiconductor memory 114 and the like, but also constituted by memory units (not shown) including ROM, hard disk and the like that are built in the respective units of the signal separator 100 or 200, in which the programs to be provided to the user are recorded in the condition preliminarily assembled in the apparatus body.

It should be noted that in this specification, the step of describing the programs to be recorded in the recording medium not only includes the processes which are carried out in time sequence along the order described herein, but may also include processes which are executed in parallel or individually, and not processed in time sequence.

Furthermore, it should be pointed out that the present invention is not limited to the above-mentioned preferred embodiments and may be applied to other embodiments. It is therefore to be understood by those of ordinary skill in the art that any changes, variations, combinations and sub-combinations may be practiced otherwise than as specifically described herein without departing from the scope and spirit of the present invention.

What is claimed is:

1. An image signal processing apparatus for separating and extracting an edge component and a non-edge component of an input image signal, the apparatus comprising:
   a first edge component extracting means for extracting a first edge component from the input image signal in a first frequency band;
   a second edge component extracting means for extracting a second edge component from the input image signal in a second frequency band wider than the first frequency band;
   a detection means for detecting an edge of the first edge component extracted through the first edge component extracting means;
   a selection means for selecting from one of the first edge component extracted through the first edge component extracting means and the second edge component extracted through the second edge component extracting means as the edge component of the input image signal, based on the edge of the first edge component detected by the detection means; and
   a non-edge component extracting means for extracting the non-edge component of the input image signal.

2. The apparatus according to claim 1, wherein the second frequency band includes the first frequency band.

3. The apparatus according to claim 1, wherein the first edge component extracting means and the second edge component extracting means respectively detect a change in signal level related to the first frequency band and the second frequency band included in the input image signal, and extract from the input image signal a smoothed signal of the change in signal level for other frequency bands.

4. The apparatus according to claim 1, further comprising a differentiation means for calculating a differentiated value of the first edge component extracted through the first edge component extracting means, wherein the detection means compares the differentiated value with a threshold value and detects the edge of the first edge component based on a result of the comparison.

5. The apparatus according to claim 1, wherein the selection means selects:
   the second edge component as the edge component of the input image signal if the detection means detects the edge of the first edge component; and
   the first edge component as an edge component of the input image signal if the detection means does not detect the edge of the first edge component.

6. The apparatus according to claim 1, wherein the non-edge component extracting means comprises a subtraction means for subtracting from the input image signal one of the first edge component and the second edge component selected by the selection means as the edge component of input the imput image signal.

7. An image signal processing method for separating and extracting an edge component and a non-edge component of an input image signal, the method comprising:
   extracting a first edge component from the input image signal in a first frequency band;
   extracting a second edge component from the input image signal in a second frequency band wider than the first frequency band;
   detecting an edge of the first edge component;
   selecting one of the first edge component and the second edge component as the edge component of the input image signal, based on the edge of the first edge component detected by the detection means; and
   extrating the non-edge component from the input image signal.

8. An image signal processing apparatus for separating and extracting an edge component and a non-edge component of an input image signal, the apparatus comprising:
   a first edge component extracting means for extracting a first edge component from the input image signal in a first frequency band;
   a second edge component extracting means for extracting a second edge component from the input image signal in a second frequency band wider than the first frequency band;
   a mixing means for mixing the first edge component with the second edge component; and
   a non-edge component extracting means for extracting the non-edge component of the input image signal.

9. The apparatus according to claim 8, wherein the second frequency band includes the first frequency band.

10. The apparatus according to claim 8, wherein the first edge component extracting means and the second edge component extracting means respectively detect a change in signal level related to the first frequency band and the second frequency band included in the input image signal, and extract from the input image signal a smoothed signal of the change in signal level for other frequency bands.

11. The apparatus according to claim 8, further comprising a differentiation means for calculating a differentiated value of the first edge component extracted through the first edge component extracting means, wherein the mixing means mixes the first edge component with the second edge component based on a magnitude of the differentiated value.

12. The apparatus according to claim 11, wherein the mixing means:
   increases a mixing rate of the first edge component and decreases a mixing rate of the second edge component according to a decrease of the differentiated value of the first edge component; and
   decreases a mixing rate of the first edge component and increases a mixing rate of the second edge component according to an increase of the differentiated value of the first edge component.

13. The apparatus according to claim 12, wherein the mixing means:
   outputs the first edge component without mixing the second edge component if the differentiated value of the first edge component is smaller than a first threshold value; and
   outputs the second edge component without mixing the first edge component if the differentiated value of the first edge component is larger than a second threshold value.

14. The apparatus according to claim 8, wherein the non-edge component extracting means comprises a subtraction means for subtracting from the input image signal an edge component constituted by a signal comprising the first edge component and the second edge component mixed by the mixing means.

15. An image signal processing method for separating and extracting an edge component and a non-edge component of an input image signal, the method comprising:

extracting a first edge component from the input image signal in a first frequency band;

extracting a second edge component from the input image signal in a second frequency band wider than the first frequency band;

mixing the first edge component with the second edge component; and extracting the non-edge component from the input image signal.

* * * * *

UNITED STATES PATENT AND TRADEMARK OFFICE
CERTIFICATE OF CORRECTION

| | |
|---|---|
| PATENT NO. | : 7,260,268 B2 |
| APPLICATION NO. | : 10/443926 |
| DATED | : August 21, 2007 |
| INVENTOR(S) | : Mitsuyasu Asano et al. |

Page 1 of 1

It is certified that error appears in the above-identified patent and that said Letters Patent is hereby corrected as shown below:

On the title page, item (57), line 14, "process, may" should read --process may--.

In claim 6, column 13, line 56, "input the imput" should read --the input--.

In claim 7, column 14, line 3, " extrating" should read --extracting--.

Signed and Sealed this

Eleventh Day of December, 2007

JON W. DUDAS
*Director of the United States Patent and Trademark Office*